US007314423B2

(12) United States Patent
Park

(10) Patent No.: US 7,314,423 B2
(45) Date of Patent: *Jan. 1, 2008

(54) HYDRAULIC CONTROL SYSTEM OF 6-SPEED AUTOMATIC TRANSMISSION FOR VEHICLE

(75) Inventor: Jin Mo Park, Gwacheon (KR)

(73) Assignee: Hyundai Motor Company, Seoul (KR)

( * ) Notice: Subject to any disclaimer, the term of this patent is extended or adjusted under 35 U.S.C. 154(b) by 241 days.

This patent is subject to a terminal disclaimer.

(21) Appl. No.: 11/213,476

(22) Filed: Aug. 25, 2005

(65) Prior Publication Data

US 2007/0049447 A1    Mar. 1, 2007

(51) Int. Cl.
*F16H 31/00*    (2006.01)
(52) U.S. Cl. .................. 475/116; 477/130; 477/131
(58) Field of Classification Search ............... None
See application file for complete search history.

(56) References Cited

U.S. PATENT DOCUMENTS

| 5,616,093 A * | 4/1997 | Long et al. ................. 475/120 |
| 6,942,591 B2 * | 9/2005 | Park ........................... 475/127 |
| 2007/0049446 A1 * | 3/2007 | Park ........................... 475/116 |

FOREIGN PATENT DOCUMENTS

DE    10358005 B3    1/2005

* cited by examiner

*Primary Examiner*—David D. Le
(74) *Attorney, Agent, or Firm*—Morgan Lewis & Bockius LLP

(57) ABSTRACT

A hydraulic control system of a six-speed automatic transmission provides an enhanced overall performance by achieving precise and effective control by providing a failsafe function in at least two ways.

20 Claims, 7 Drawing Sheets

FIG.2

|  | C1 | C2 | C3 | B1 | B2 | OWC |
|---|---|---|---|---|---|---|
| 1st Gear | ○ |  |  | E |  | ○ |
| 2nd Gear | ○ |  |  |  | ○ |  |
| 3rd Gear | ○ | ○ |  |  |  |  |
| 4th Gear | ○ |  | ○ |  |  |  |
| 5th Gear |  | ○ | ○ |  |  |  |
| 6th Gear |  |  | ○ |  | ○ |  |
| Rear Gear |  | ○ |  | ○ |  |  |

E : Operated for an engine brake

HYDRAULIC CONTROL SYSTEM OF 6-SPEED AUTOMATIC TRANSMISSION FOR VEHICLE

BACKGROUND OF THE INVENTION (a) Field of the Invention

The present invention relates to a hydraulic control system of a six-speed automatic transmission for a vehicle. More particularly, the present invention relates to such a control system that minimizes shift shock and reduces fuel consumption.

(b) Description of the Related Art

Typical automatic transmissions include a torque converter and a powertrain of a multiple speed gear mechanism connected to the torque converter. In addition, a hydraulic control system is provided in an automatic transmission for selectively operating at least one operational element included in the powertrain according to a running state of a vehicle.

Such an automatic transmission includes a powertrain and a hydraulic control system. The powertrain includes a compound planetary gear set, formed by combining at least two simple planetary gear sets to achieve the required multiple speeds, and a plurality of friction members. The hydraulic control system selectively operates the friction members of the powertrain according to driving conditions.

A variety of such powertrains and hydraulic control systems have been developed by vehicle manufacturers according to their own schemes. Currently, four-speed automatic transmissions are most often found on the market. However, a five-speed automatic transmission has also been realized for enhancement of performance of power transmission and for enhanced fuel mileage of a vehicle.

Recently, developing further from such five-speed automatic transmissions, six-speed automatic transmissions are under investigation such that performance of power transmission of an automatic transmission, and thereby fuel-mileage of a vehicle, are being further enhanced. Recently developed six-speed automatic transmissions achieve six forward speeds by a combination of two planetary gear sets, three clutches, two brakes, and one one-way clutch, which is simpler than a conventional five-speed automatic transmission formed by adding an additional planetary gear set to a four-speed automatic transmission.

The above information disclosed in this Background section is only for enhancement of understanding of the background of the invention and therefore, it may contain information that does not form the prior art that is already known in this country to a person or ordinary skill in the art.

SUMMARY OF THE INVENTION

Embodiments of the present invention provide a hydraulic control system applicable to a powertrain of a six-speed automatic transmission for a vehicle having five friction members, thereby obtaining enhanced overall performance by achieving a minimization of shift shock and an enhancement of fuel consumption as a consequence of achieving precise and effective control by providing a fail-safe function in at least two ways.

A hydraulic control system of a six-speed automatic transmission for a vehicle according to an exemplary embodiment of the present invention includes a first clutch control portion, a first brake and third clutch control portion, a second clutch control portion, and a second brake control portion. The first clutch control portion controls a forward range pressure according to a control of a first proportional control solenoid valve so as to supply the forward range pressure to a first clutch at first, second, third, and fourth forward speeds and prevents hydraulic pressure from being supplied to the first clutch when the first proportional control solenoid valve is turned off at fourth, fifth, and sixth forward speeds. The first brake and third clutch control portion controls and selectively supplies the forward range pressure to a first brake or a third clutch according to a control of a second proportional control solenoid valve at the fourth, fifth, and sixth forward speeds, a low L range, and a reverse R range and maintains a hydraulic line to the third clutch at the fourth, fifth, and sixth forward speeds in the case that an on/off solenoid valve controlling a spool valve controlling the hydraulic line to the third clutch malfunctions to be turned off. The second clutch control portion supplies a line pressure to a second clutch according to a control of a third proportional control solenoid valve at the third and fifth forward speeds and a reverse speed. The second brake control portion supplies the forward range pressure to a second brake according to a control of a fourth proportional control solenoid valve at the second and sixth forward speeds and controls an operating pressure of the second brake to be larger at the sixth forward speed than at the second forward speed.

In a further embodiment, the first, second and third proportional control solenoid valves are duty control valves outputting a maximum hydraulic pressure in a turned-off state, and the fourth proportional control solenoid valve is a duty control valve outputting a minimum hydraulic pressure in a turned-off state.

In a further embodiment, the first clutch control portion includes a first clutch side switching valve and a first clutch side pressure control valve controlled by the first proportional control solenoid valve, and a first switching valve controlling operating pressure supply to the first clutch through the first clutch side pressure control valve by controlling a hydraulic line of the forward range pressure supplied from a manual valve.

In a further embodiment, the first clutch side switching valve includes a valve body, and a valve spool. The valve body includes a first port receiving a control pressure from the first proportional control solenoid valve, a second port formed at an opposite side to the first port and receiving a reduced pressure of the reducing valve as its control pressure, a third port partially receiving the operating pressure supplied to the first clutch, and a fourth port selectively supplying the hydraulic pressure received through the third port to the first clutch side pressure control valve as a control pressure thereof. The valve spool includes a first land receiving the control pressure supplied from the first port, and a second land receiving the control pressure supplied through the second port and selectively enabling communication of the third and fourth ports, cooperatively with the first land, wherein the first land is provided with an elastic member forming an elastic force that always biases the valve spool to the left in the drawing.

In a further embodiment, the first clutch side pressure control valve includes a valve body, and a valve spool. The valve body includes a first port receiving a control pressure from the first clutch side switching valve, a second port receiving a control pressure from the first proportional control solenoid valve, a third port receiving an operating pressure of the first clutch supplied from the first switching valve, a fourth port selectively supplying the hydraulic pressure received through the third port to the first clutch, and a fifth port returning the hydraulic pressure received through the fourth port. The valve spool includes a first land selectively closing the third port by the control pressure received through the first port, a second land enabling communication of the third and fourth ports or the fourth and fifth ports in cooperation with the first land, and a third land receiving the control pressure supplied through the second port, wherein an elastic member is disposed between the first land and the valve body.

In a further embodiment, the first switching valve includes a valve body, and a valve spool. The valve body includes a first port receiving a forward range pressure, a second port receiving the line pressure as its control pressure, a third port supplying the hydraulic pressure received through the first port to the first clutch side pressure control valve, a fourth port receiving the operating pressures of the second clutch and the second brake as its control pressure, a fifth port receiving the operating pressure of the third clutch as its control pressure, and a sixth port exhausting the hydraulic pressure received through the third port. The valve spool includes a first land receiving the control pressure supplied through the second port, a second land receiving the hydraulic pressure supplied through the fifth port and selectively enabling communication of the third port to the first and sixth ports, and a third land receiving the control pressure supplied through the fourth port, wherein an elastic member is disposed between the third land and the valve body.

In a further embodiment, the first switching valve is structured such that, while the control pressure is supplied through the first port, the valve spool does not move toward the first port in response to a control pressure supplied through only one port of the fourth and fifth ports.

In a further embodiment, the first brake and third clutch control portion includes a third clutch side switching valve and a third clutch side pressure control valve controlled by the second proportional control solenoid valve, a control valve controlled by the liner pressure and an on/off solenoid valve and enabling hydraulic line conversion of hydraulic pressure supplied from the third clutch side pressure control valve, and a second switching valve controlled by an on/off solenoid valve and supplying the hydraulic pressure supplied from the control valve to the third clutch.

In a further embodiment, the third clutch side switching valve includes a valve body, and a valve spool. The valve body includes a first port receiving a control pressure from the second proportional control solenoid valve, a second port formed at an opposite side to the first port and receiving a reduced pressure of the reducing valve as its control pressure, a third port partially receiving the operating pressure supplied to the first brake or the third clutch, and a fourth port selectively supplying the hydraulic pressure received through the third port to the third clutch side pressure control valve as a control pressure thereof. The valve spool including a first land receiving the control pressure supplied from the first port and a second land receiving the control pressure supplied through the second port and selectively enabling communication of the third and fourth ports, wherein the first land is provided with an elastic member forming an elastic force that always biases the valve spool to the left in the drawing.

In a further embodiment, the third clutch side pressure control valve includes a valve body, and a valve spool. The valve body includes a first port receiving a control pressure from the second proportional control solenoid valve, a second port receiving a control pressure from the third clutch side switching valve, a third port receiving the forward range pressure from the manual valve, a fourth port supplying the hydraulic pressure received through the third port to the control valve and the third clutch side switching valve, and a fifth port returning the hydraulic pressure received through the fourth port.

The valve spool includes a first land selectively closing the third port by the control pressure received through the second port, a second land enabling communication of the third and fourth ports or the fourth and fifth ports in cooperation with the first land, and a third land receiving the control pressure supplied through the second port, wherein an elastic member is disposed between the first land and the valve body.

In a further embodiment, the control valve includes a valve body, and a valve spool.

The valve body includes a first port receiving the line pressure, a second port receiving a control pressure from the second on/off solenoid valve, a third port receiving a hydraulic pressure from the third clutch side pressure control valve, a fourth port supplying the hydraulic pressure received through the third port to the first brake as an operating pressure thereof, a fifth port supplying the hydraulic pressure received through the third port to the second switching valve, a sixth port exhausting the hydraulic pressure supplied through the fifth port, and a seventh port receiving an operating pressure from the third clutch as its control pressure. The valve spool includes a first land receiving a control pressure supplied through the second port, a second land selectively enabling communication of the fourth port to an exhaust port, a third land selectively enabling communication of the third port to the fourth and fifth ports, a fourth land selectively opening the fifth port by the control pressure supplied through the first port, and a fifth land receiving the control pressure supplied through the seventh port.

In a further embodiment, the second switching valve includes a valve body, and a valve spool. The valve body includes a first port receiving a control pressure from the fourth proportional control solenoid valve, a second port supplying the control pressure received through the first port to the second brake side pressure control valve, a third port receiving a hydraulic pressure from the control valve as an operating pressure for the third clutch, a fourth port supplying the hydraulic pressure received through the third port to the third clutch, a fifth port exhausting the hydraulic pressure supplied through the fourth port, sixth and seventh ports bifurcated from the fourth port and utilizing the hydraulic pressure output from the fourth port as a control pressure of the second switching valve, and an eighth port receiving a control pressure from the first on/off solenoid valve. The valve spool includes a first land selectively opening the first port, a second land selectively enabling communication of the first and second ports in cooperation with the first land, a third land selectively enabling communication of the third and fourth ports in cooperation with the second land, and a fourth land receiving the control pressure supplied through the eighth port, wherein the third land and the fourth land are dividedly formed, and an elastic member is disposed between the first land and the valve body.

In a further embodiment, the third and fourth lands are dividedly formed such that the divided position may be placed at the sixth port when the valve spool is moved to the right and at the seventh port when moved to the left.

In a further embodiment, the second clutch control portion includes a second clutch side switching valve and a second clutch side pressure control valve that are controlled by the third proportional control solenoid valve such that a hydraulic pressure may be supplied to the second clutch.

In a further embodiment, the second clutch side switching valve includes a valve body, and a valve spool. The valve body includes a first port receiving a control pressure from the third proportional control solenoid valve, a second port disposed opposite to the first port and receiving a reduced pressure of the reducing valve as its control pressure, a third port partially receiving the operating pressure of the second clutch supplied from the second clutch side pressure control valve, and a fourth port supplying the hydraulic pressure selectively received through the third port to the second clutch side pressure control valve as its control pressure. The valve spool includes a first land receiving a control pressure supplied through the first port and a second land receiving a control pressure supplied through the second port and selectively enabling communication of the third and fourth ports in cooperation with the first land, wherein the first land is provided with an elastic member forming an elastic force that always biases the valve spool to the left in the drawing.

In a further embodiment, the second clutch side pressure control valve includes a valve body, and a valve spool. The valve body includes a first port receiving a control pressure from the third proportional control solenoid valve, a second port receiving a control pressure from the second clutch side switching valve, a third port receiving the line pressure, a fourth port supplying the hydraulic pressure received through the third port to the second clutch, and a fifth port exhausting the hydraulic pressure supplied through the fourth port. The valve spool includes a first land receiving the control pressure supplied through the first port, a second land selectively opening/closing the fifth port, and a third land selectively enabling communication of the fourth port to the third and fifth ports in cooperation with the second land, wherein an elastic member is disposed between the third land and the valve body.

In a further embodiment, the second brake control portion includes a second brake side switching valve and a second brake side pressure control valve that are controlled by a fourth proportional control solenoid valve such that the second brake may receive a hydraulic pressure.

In a further embodiment, the second brake side switching valve includes a valve body, and a valve spool. The valve body includes a first port receiving a control pressure from the fourth proportional control solenoid valve, a second port disposed opposite to the first port and receiving a reduced pressure of the reducing valve as its control pressure, a third port partially receiving the operating pressure of the second brake supplied from the second brake side pressure control valve, and a fourth port supplying the hydraulic pressure of the third port to the second brake side pressure control valve as its control pressure. The valve spool includes a first land receiving the control pressure supplied from the first port and a second land receiving the control pressure supplied through the second port and selectively enabling communication of the third and fourth ports in cooperation with the first land, wherein the first land is provided with an elastic member forming an elastic force that always biases the valve spool to the left in the drawing.

In a further embodiment, the second clutch side pressure control valve includes a valve body, and a valve spool. The valve body includes a first port receiving a control pressure from the fourth proportional control solenoid valve, a second port receiving a control pressure from the second brake side switching valve, a third port receiving the line pressure, a fourth port supplying the hydraulic pressure received through the third port to the second brake, a fifth port exhausting the hydraulic pressure supplied through the fourth port, and a sixth port communicating with the second port of the second switching valve. The valve spool includes a first land receiving the control pressure supplied through the first port, a second land selectively opening/closing the fifth port, a third land selectively enabling communication of the fourth port to the third and fifth ports in cooperation with the second land, and a fourth land receiving the control pressure supplied through the second port, wherein an elastic member is disposed between the fourth land and the valve body.

In a further embodiment, the first switching valve is connected to an upstream side of the second clutch and the second brake, interposing a second shuttle valve, such that the hydraulic pressure supplied to the second clutch and the second brake may be partially supplied to the first switching valve.

BRIEF DESCRIPTION OF THE DRAWINGS

FIG. 2 is an operational chart for frictional members of a powertrain shown in FIG. 1.

DETAILED DESCRIPTION OF THE EMBODIMENTS

An embodiment of the present invention will hereinafter be described in detail with reference to the accompanying drawings.

Figure 1:
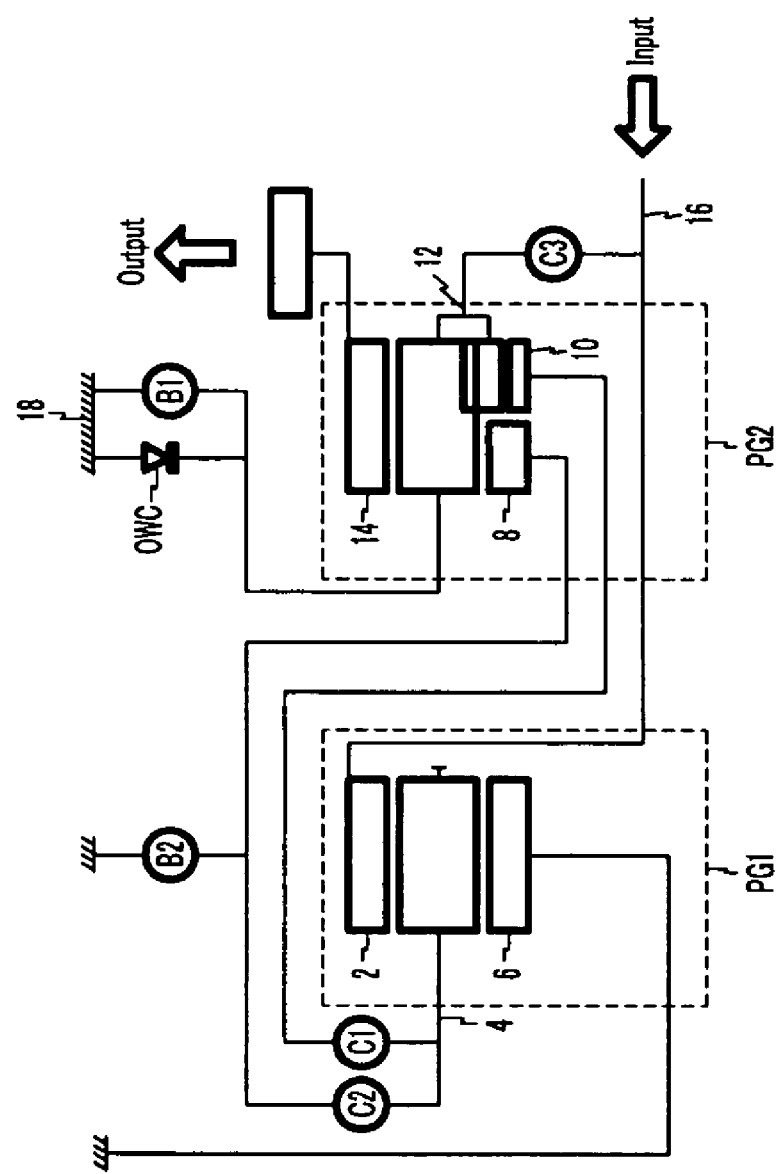
FIG. 1 is a schematic diagram of an exemplary powertrain that may be operated by a hydraulic control system according to an exemplary embodiment of the present invention.

As shown in FIG. 1, an exemplary six-speed powertrain that may be operated by a hydraulic control system according to an exemplary embodiment of the present invention is formed by a first planetary gear set PG1 of a single pinion planetary gear set and a second planetary gear set PG2 of a Ravingneaux planetary gear set. The second planetary gear set PG2 is disposed toward an engine side and the first planetary gear set PG1 is disposed rearward thereto.

Hereinafter, for better comprehension and ease of description, a ring gear of the first planetary gear set PG1 is called a first ring gear 2, a planet carrier thereof is called a first planet carrier 4, and a sun gear thereof is called a the first sun gear 6, respectively. Regarding the second planetary gear set PG2, a sun gear engaged with a long pinion is called a second sun gear 8, a sun gear engaged with a short pinion is called a third sun gear 10, a planet carrier supporting the long and short pinions is called a third planet carrier 12, and a ring gear of the second planetary gear set PG2 is called a third ring gear 14.

In combining such planetary gear sets, the first ring gear 2 is directly connected to an input shaft 16 connected to an engine output side via a torque converter (not shown), such that the first ring gear 2 always acts as an input element.

The first planet carrier 4 is variably connected to the third sun gear 10 via a first clutch C1 and also to the second sun gear 8 via a second clutch C2. The first sun gear 6 always acts as a fixed element by being fixedly connected to a transmission housing 18.

The third planet carrier 12 is variably connected to an input shaft 16 via a third clutch C3 and also to the transmission housing 18 via a first brake B1 and a one-way clutch OWC that are arranged in parallel. The third ring gear 14 is connected to an output gear and accordingly to a differential apparatus (not shown).

A connecting member interconnecting the second clutch C2 and the second sun gear 8 is connected to the transmission housing 18 via a second brake B2 and accordingly, the second sun gear 8 selectively acts as a fixed element.

Such a structured powertrain may be operated according to an operational chart shown in FIG. 2 to achieve six forward speeds and one reverse speed. That is, the first clutch C1 is operated for the first forward speed. The first clutch C1 and the second brake B2 are operated for the second forward speed. The first and second clutches C1 and C2 are operated for the third forward speed. The first and third clutches C1 and C3 are operated for the fourth forward speed. The second and third clutches C2 and C3 are operated for the fifth forward speed. The third clutch C3 and the second brake B2 are operated for the sixth forward speed. The second clutch C2 and the first brake B1 are operated for the reverse speed. Further, the first brake B1 may also be operated for the first forward speed when an engine brake is required such as in the case of L range.

A shifting operation formed by operating the frictional elements according to the operational chart shown in FIG. 2 will be understood by a person of ordinary skill in the art based on the teachings herein and thus need not be described in further detail.

Figure 3:
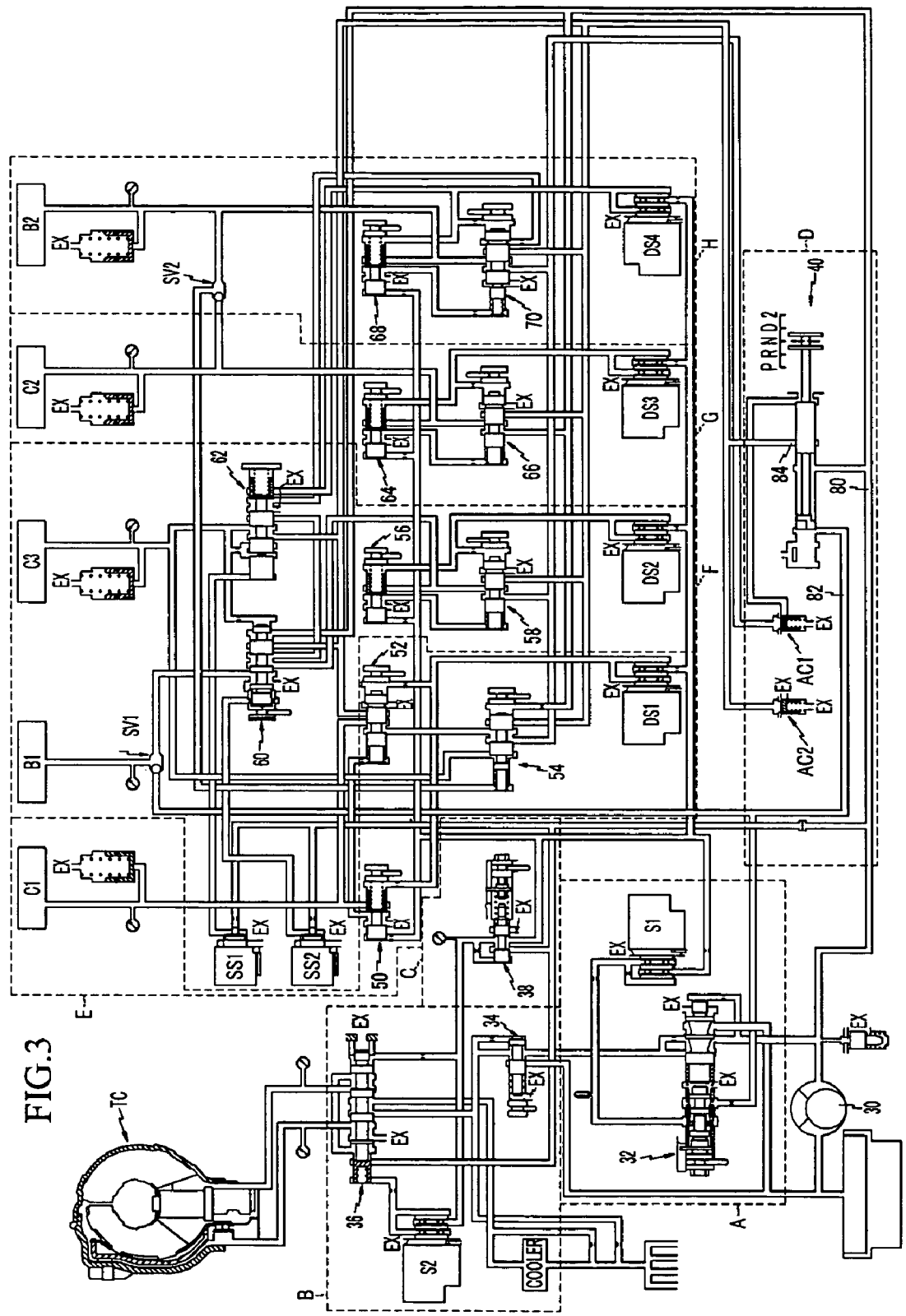
FIG. 3 is a schematic diagram of a hydraulic control system according to an exemplary embodiment of the present invention.

As a hydraulic control system for operating such a powertrain, as shown in FIG. 3, a hydraulic control system according to an exemplary embodiment of the present invention includes a line pressure control portion A, a launch control portion B, a pressure reduction control portion C, a manual shift control portion D, a first clutch control portion E, a first brake and third clutch control portion F, a second clutch control portion G, and a second brake control portion H, so as to control supply and release of hydraulic pressure to the friction members C1, C2, C3, B1, and B2.

The line pressure control portion A, the launch control portion B, and the pressure reduction control portion C may be formed according to a conventional scheme. According to an exemplary embodiment of the present invention, the line pressure control portion A includes a regulator valve 32 and a proportional control solenoid valve S1 controlling the same. Therefore, the hydraulic pressure supplied from a hydraulic pump 30 may be controlled to be stable and a line pressure may be varied according to driving conditions. Therefore, fuel consumption of a vehicle may be enhanced.

The launch control portion B includes a torque converter control valve 34, a damper clutch control valve 36, and a proportional control solenoid valve S2. The torque converter control valve 34 reduces the line pressure in order to properly control a damper clutch for an enhancement of fuel consumption at high speed and to utilize a torque multiplication effect of a torque converter TC under acceleration. The damper clutch control valve 36 controls engagement and release of the damper clutch. The proportional control solenoid valve S2 controls the damper clutch control valve 36 according to an electrical signal from a transmission control unit (TCU). The TCU may include a processor, memory and associated hardware, software and/or firmware as may be selected and programmed by a person of ordinary skill based on the teachings herein.

The pressure reduction control portion C includes a reducing valve 38. The pressure reduction control portion C reduces the hydraulic pressure supplied from the hydraulic pump 30 and then supplies the reduced pressure to solenoid valves S1 and S2 as their control pressures, and also to respective clutch/brake control portions as their control pressures.

The manual shift control portion D includes a manual valve 40 that enables conversion of hydraulic lines according to a manual shifting.

The first clutch control portion E includes a first clutch side switching valve 50, a first clutch side pressure control valve 52, and a first switching valve 54. The first clutch side switching valve 50 and the first clutch side pressure control valve 52 are controlled by a first proportional control solenoid valve DS1. The first switching valve 54 controls an operating pressure of the first clutch C1 in response to control pressure of the line pressure and a hydraulic pressure from the second clutch C2 or the second brake B2.

The first brake and third clutch control portion F includes a third clutch side switching valve 56, a third clutch side pressure control valve 58, a control valve 60, a second switching valve 62, and first and second on/off solenoid valves SS1 and SS2. The third clutch side switching valve 56 and the third clutch side pressure control valve 58 are controlled by a second proportional control solenoid valve DS2. The control valve 60 enables hydraulic line conversion of hydraulic pressure supplied from the third clutch side pressure control valve 58. The second switching valve 62 supplies the hydraulic pressure supplied from the control valve 60 to the third clutch C3. The first and second on/off solenoid valves SS1 and SS2 control the second switching valve 62 and the control valve 60.

The second clutch control portion G includes a second clutch side switching valve 64 and a second clutch side pressure control valve 66 that are controlled by a third proportional control solenoid valve DS3. The second brake control portion H includes a second brake side switching valve 68 and a second brake side pressure control valve 70 that are controlled by a fourth proportional control solenoid valve DS4.

In more detail, as shown in FIG. 3, the manual valve 40 supplies the hydraulic pressure, supplied from a line pressure line 80 connected to the regulator valve 32, selectively to a reverse range pressure line 82 and a forward range pressure line 84 according to a change in drive ranges.

The reverse range pressure line 82 is connected to the regulator valve 32 so as to control the line pressure in the reverse R range and is also connected to the first brake B1 so as to supply a reverse range pressure thereto. The forward range pressure line 84 is arranged to be capable of supplying operating pressure to respective control portions controlling friction members.

Figure 4:
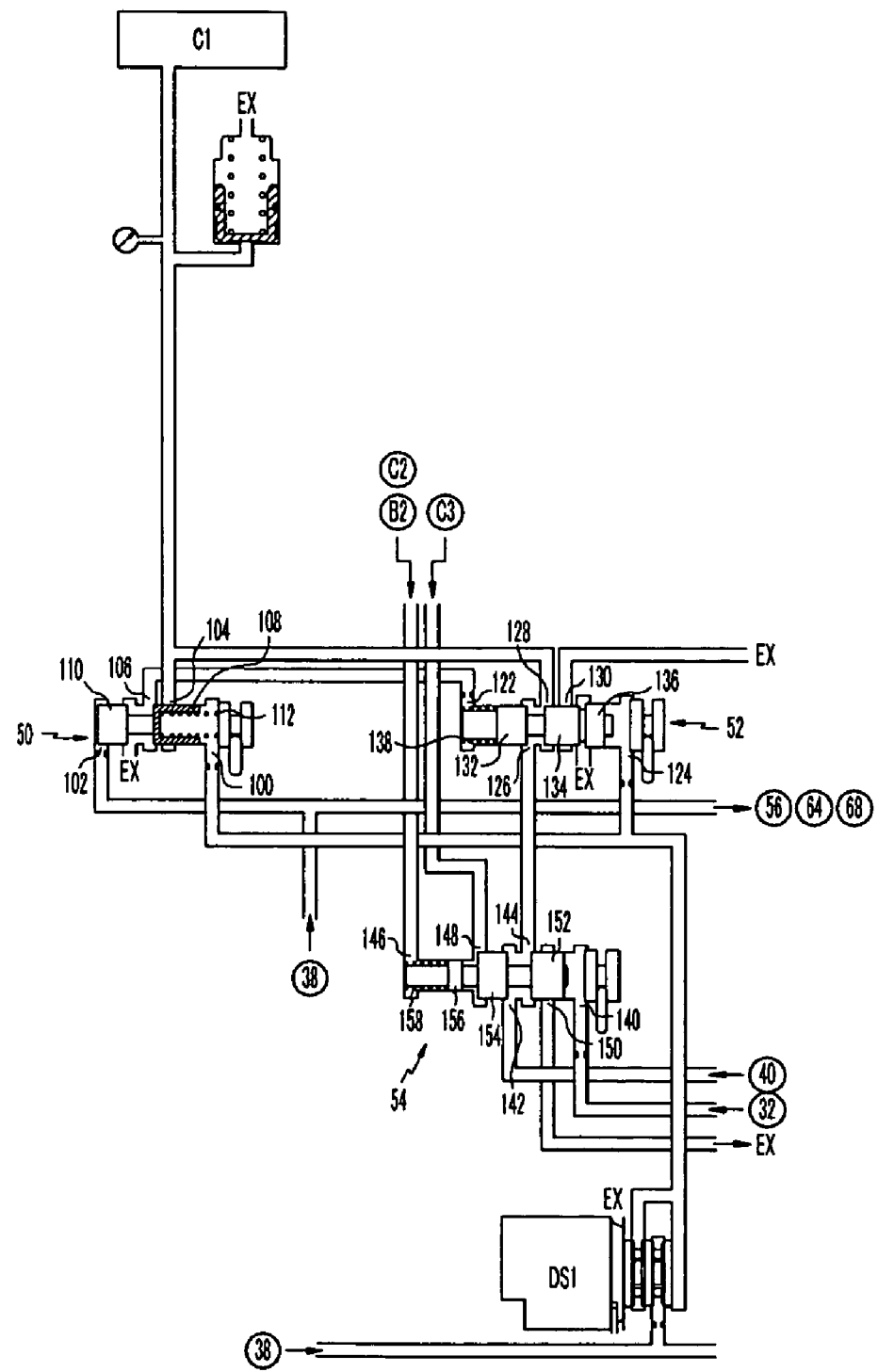
FIG. 4 is detailed diagram of a control portion for a first clutch according to an exemplary embodiment of the present invention.

FIG. 4 is a detailed diagram of an exemplary first clutch control portion E. The first clutch side switching valve 50 includes a valve body and a valve spool installed therein.

The valve body of the first clutch side switching valve 50 includes first to fourth ports 100, 102, 104, and 106. The first port 100 receives a control pressure from the first proportional control solenoid valve DS1. The second port 102 is formed at an opposite side of the first port 100 and receives a reduced pressure of the reducing valve 38 as its control pressure. The third port 104 partially receives the operating pressure supplied to the first clutch C1. The fourth port 106 selectively supplies the hydraulic pressure received through the third port 104 to the first clutch side pressure control valve 52 as a control pressure thereof.

The valve spool installed in the valve body of first clutch side switching valve 50 includes first and second lands 108 and 110. The first land 108 receives the control pressure supplied from the first port 100. The second land 110 receives the control pressure supplied through the second port 102 and selectively enables communication of the third and fourth ports 104 and 106, cooperatively with the first land 108. The first land 108 is provided with an elastic member 112 forming an elastic force that always biases the valve spool to the left in the drawing.

By the reduced pressure supplied through the second port 102, the valve spool moves to the right in the drawing such that the third and fourth ports 104 and 106 may communicate with each other. When a duty control pressure of the first proportional control solenoid valve DS1 is supplied through the first port 100, the valve spool moves to the left in the drawing by an amount corresponding to the duty control pressure. In this case, a cross-sectional area of the communication passage between the third and fourth ports 104 and 106 is accordingly adjusted, thereby adjusting the control pressure supplied to the first clutch side pressure control valve 52.

The first clutch side pressure control valve 52 includes a valve body and a valve spool installed therein. The valve body of the first clutch side pressure control valve 52 includes first to fifth ports 122, 124, 126, 128, and 130. The first port 122 receives a control pressure from the first clutch side switching valve 50. The second port 124 receives a control pressure from the first proportional control solenoid valve DS1. The third port 126 receives an operating pressure of the first clutch C1 supplied from the first switching valve 54. The fourth port 128 selectively supplies the hydraulic pressure received through the third port 126 to the first clutch C1. The fifth port 130 returns the hydraulic pressure received through the fourth port 128.

The valve spool of the first clutch side pressure control valve 52 includes first to third lands 132, 134, and 136. The first land 132 selectively closes the third port 126 by the control pressure received through the first port 122. The second land 134 enables communication of the third and fourth ports 126 and 128 or the fourth and fifth ports 128 and 130, cooperatively with the first land 132. The third land 136 receives the control pressure supplied through the second port 124. In addition, an elastic member 138 is disposed between the first land 132 and the valve body.

When a control pressure is supplied through the first port 122, the valve spool moves to the right in the drawing and thereby closes the third port 126 and enables communication of the fourth and fifth ports 128 and 130. When the duty control pressure of the first proportional control solenoid valve DS1 is supplied through the second port 124, the valve spool moves to the left in the drawing by an amount corresponding to the duty control pressure, thereby communicating the third and fourth ports 126 and 128.

The first switching valve 54 includes a valve body and a valve spool installed therein. The valve body of the first switching valve 54 includes first to sixth ports 140, 142, 144, 146, 148, and 150. The first port 140 receives a forward range pressure as its control pressure. The second port 142 receives the line pressure. The third port 144 supplies the hydraulic pressure received through the second port 142 to the first clutch side pressure control valve 52. The fourth port 146 receives the operating pressures of the second clutch C2 and the second brake B2 as its control pressure. The fifth port 148 receives the operating pressure of the third clutch C3 as its control pressure. The sixth port 150 exhausts the hydraulic pressure supplied through the third port 144.

The valve spool installed in the valve body of the first switching valve 54 includes first to third lands 152, 154, and 156. The first land 152 receives the control pressure supplied through the second port 142. The second land 154 receives the hydraulic pressure supplied through the fifth port 148 and selectively enables communication of the third port 144 to the first and sixth ports 140 and 150. The third land 156 receives the control pressure supplied through the fourth port 146. In addition, an elastic member 158 is disposed between the third land 156 and the valve body.

The first switching valve 54 is structured such that, while the control pressure is supplied through the first port 140, the valve spool does not move toward the first port 140 in response to a control pressure supplied through only one port of the fourth and fifth ports 146 and 148.

Figure 5:
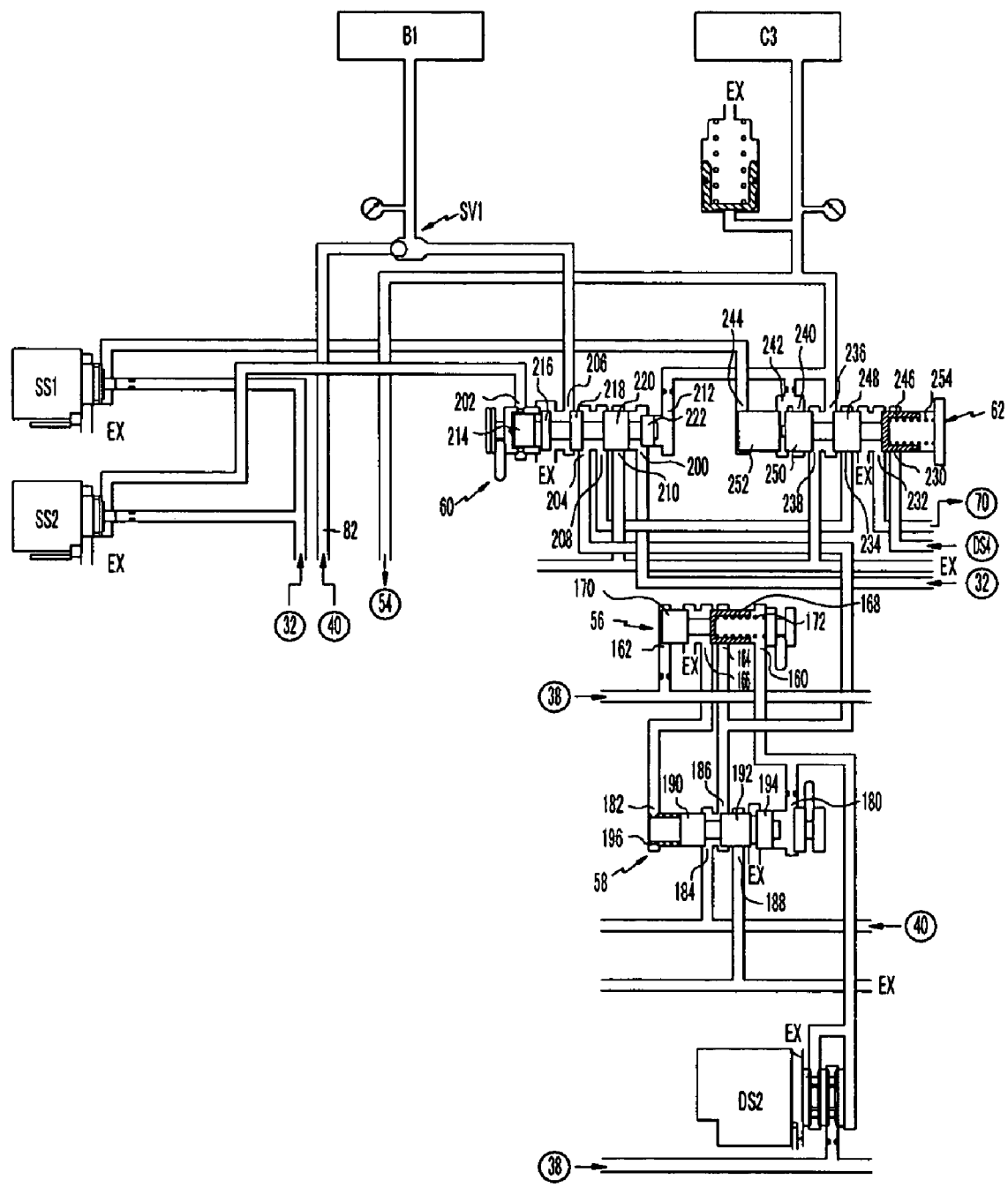
FIG. 5 is detailed diagram of a control portion for a first brake and a third clutch according to an exemplary embodiment of the present invention.

FIG. 5 is a detailed diagram of an exemplary first brake and third clutch control portion F. The third clutch side switching valve 56 includes a valve body and a valve spool installed therein.

The valve body of the third clutch side switching valve 56 includes first to fourth ports 160, 162, 164, and 166. The first port 160 receives a control pressure from the second proportional control solenoid valve DS2. The second port 162 is formed at an opposite side of the first port 160 and receives a reduced pressure of the reducing valve 38 as its control pressure. The third port 164 partially receives the operating pressure supplied to the first brake B1 or the third clutch C3. The fourth port 166 selectively supplies the hydraulic pressure received through the third port 164 to the third clutch side pressure control valve 58 as a control pressure thereof.

The valve spool installed in the valve body of the third clutch side switching valve 56 includes first and second lands 168 and 170. The first land 168 receives the control pressure supplied from the first port 160. The second land 170 receives the control pressure supplied through the second port 162 and selectively enables communication of the third and fourth ports 164 and 166. The first land 168 is provided with an elastic member 172 forming an elastic force that always biases the valve spool to the left in the drawing.

By the reduced pressure supplied through the second port 162, the valve spool moves to the right in the drawing such that the third and fourth ports 164 and 166 may communicate with each other. When a duty control pressure of the second proportional control solenoid valve DS2 is supplied through the first port 160 the valve spool moves to the left in the drawing by an amount corresponding to the duty control pressure. In this case, a cross-sectional area of the communication passage between the third and fourth ports 164 and 166 is accordingly adjusted, thereby adjusting the control pressure supplied to the third clutch side pressure control valve 58.

The third clutch side pressure control valve 58 includes a valve body and a valve spool installed therein. The valve body of the third clutch side pressure control valve 58 includes first to fifth ports 180, 182, 184, 186, and 188. The first port 180 receives a control pressure from the second proportional control solenoid valve DS2. The second port 182 receives a control pressure from the third clutch side switching valve 56. The third port 184 receives the forward range pressure from the manual valve 40. The fourth port 186 supplies the hydraulic pressure received through the third port 184 to the control valve 60 and the third clutch side switching valve 56. The fifth port 188 returns the hydraulic pressure received through the fourth port 186.

The valve spool of the third clutch side pressure control valve 58 includes first to third lands 190, 192, and 194. The first land 190 selectively closes the third port 184 by the control pressure received through the second port 182. The second land 192 enables communication of the third and fourth ports 184 and 186 or the fourth and fifth ports 186 and 188, cooperatively with the first land 190. The third land 194 receives the control pressure supplied through the second port 182. In addition, an elastic member 196 is disposed between the first land 190 and the valve body.

When a control pressure is supplied through the first port 180, the valve spool moves to the right in the drawing and thereby closes the third port 184 and enables communication of the fourth and fifth ports 186 and 188. When the duty control pressure of the second proportional control solenoid valve DS2 is applied through the first port 180, the valve spool moves to the left in the drawing by an amount corresponding to the duty control pressure and the third and fourth ports 184 and 186 communicate with each other.

The control valve 60 includes a valve body and a valve spool installed therein. The valve body of the control valve 60 includes first to seventh ports 200, 202, 204, 206, 208, 210, and 212. The first port 200 receives the line pressure. The second port 202 receives a control pressure from the second on/off solenoid valve SS2. The third port 204 receives a hydraulic pressure from the third clutch side pressure control valve 58. The fourth port 206 supplies the hydraulic pressure received through the third port 204 to the first brake B1 as an operating pressure thereof. The fifth port 208 supplies the hydraulic pressure received through the third port 204 to the second switching valve 62. The sixth port 210 exhausts the hydraulic pressure supplied through the fifth port 208. The seventh port 212 receives an operating pressure from the third clutch C3 as its control pressure.

The valve spool installed in the valve body of the control valve 60 includes first to fifth lands 214, 216, 218, 220, and 222. The first land 214 receives a control pressure supplied through the second port 202. The second land 216 selectively enables communication of the fourth port 206 to an exhaust port EX. The third land 218 selectively enables communication of the third port 204 to the fourth and fifth ports 206 and 208. The fourth land 220 selectively opens the fifth port 208 by the control pressure supplied through the first port 200. The fifth land 222 receives the control pressure supplied through the seventh port 212.

When a hydraulic pressure is supplied through the second port 202, the valve spool moves to the right in the drawing and accordingly the third and fourth ports 204 and 206 communicate with each other. When hydraulic pressure is not supplied through the second port 202 the valve spool moves to the left in the drawing by the hydraulic pressure supplied through the first port 200 and accordingly the third and fifth ports 204 and 208 communicate with each other.

In addition, a first shuttle valve SV1 is disposed to an upstream side of the first brake B1 such that the first brake B1 may receive the forward range pressure in a low L range where the engine brake is activated and receive the reverse range pressure in the reverse range.

The second switching valve 62 includes a valve body and a valve spool installed therein. The valve body of the second switching valve 62 includes first to eighth ports 230, 232, 234, 236, 238, 240, 242, and 244. The first port 230 receives a control pressure from the fourth proportional control solenoid valve DS4. The second port 232 supplies the control pressure received through the first port 230 to the second brake side pressure control valve 70. The third port 234 receives a hydraulic pressure from the control valve 60 as an operating pressure for the third clutch C3. The fourth port 236 supplies the hydraulic pressure received through the third port 234 to the third clutch C3. The fifth port 238 exhausts the hydraulic pressure supplied through the fourth port 236. The sixth and seventh ports 240 and 242 are bifurcated from the fourth port 236 and utilize the hydraulic pressure output from the fourth port 236 as a control pressure of the second switching valve 62. The eighth port 244 receives a control pressure from the first on/off solenoid valve SS1.

The valve spool installed in the valve body of the second switching valve 62 includes first to fourth lands 246, 248, 250, and 252. The first land 246 selectively opens the first port 230. The second land 248 selectively enables communication of the first and second ports 230 and 232, cooperatively with the first land 246. The third land 250 selectively enables communication of the third and fourth ports 234 and 236, cooperatively with the second land 248. The fourth land 252 receives the control pressure supplied through the eighth port 244. The third land 250 and the fourth land 252 are dividedly formed. In addition, an elastic member 254 is disposed between the first land 246 and the valve body.

The third and fourth lands 250 and 252 are dividedly formed such that the divided position may be placed at the sixth port 240 when the valve spool is moved to the right and at the seventh portion 242 when moved to the left.

Therefore, while the third clutch C3 is receiving an operating pressure, the valve spool 62 may remain moved to the right against the case of malfunction of the first on/off solenoid valve SS1.

When a control pressure is supplied from the first on/off solenoid valve SS1, the valve spool moves to the right in the drawing such that the hydraulic pressure received through the third port 234 may be supplied to the third clutch C3 through the fourth port 236.

According to such a scheme, at the sixth forward speed, the control pressure of the fourth proportional control solenoid valve DS4 is supplied to the second brake side pressure control valve 70 such that the valve spool may move to the right in the drawing. That is, the second brake B2 may be controlled by different control routes at low and high gears, such that a precise control thereof may be enabled.

Figure 6:
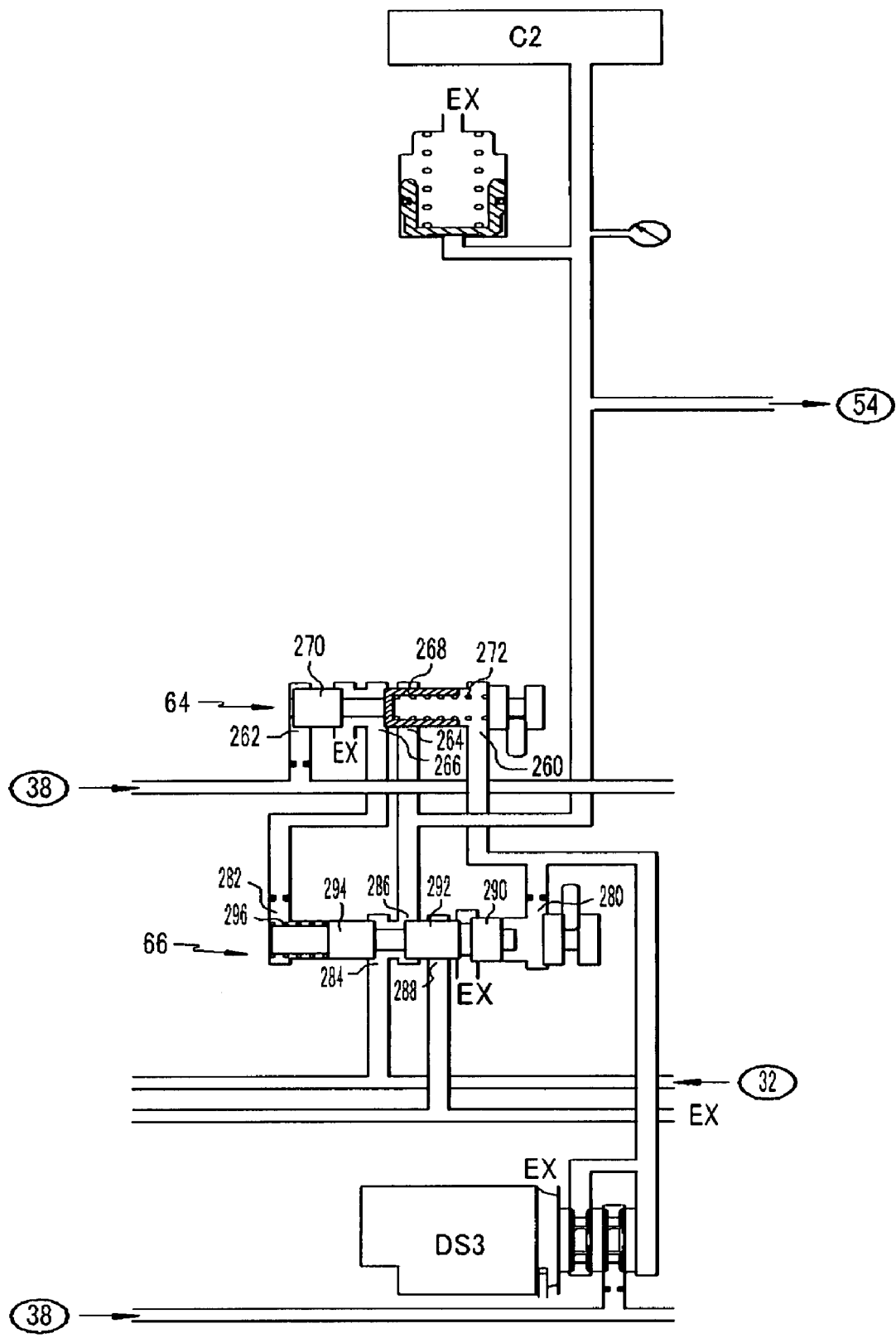
FIG. 6 is detailed diagram of a control portion for a second clutch according to an exemplary embodiment of the present invention.

FIG. 6 is a detailed diagram of an exemplary second clutch control portion G. The second clutch side switching valve 64 includes a valve body and a valve spool installed therein.

The valve body of the second clutch side switching valve 64 includes first to fourth ports 260, 262, 264, and 266. The first port 260 receives a control pressure from the third proportional control solenoid valve DS3. The second port 262 is disposed opposite to the first port 260 and receives a reduced pressure of the reducing valve 38 as its control pressure. The third port 264 partially receives the operating pressure of the second clutch C2 supplied from the second clutch side pressure control valve 66. The fourth port 266 supplies the hydraulic pressure selectively received through the third port 264 to the second clutch side pressure control valve 66 as its control pressure.

The valve spool installed in the valve body of the second clutch side switching valve 64 includes first and second lands 268 and 270. The first land 268 receives a control pressure supplied through the first port 260. The second land 270 receives a control pressure supplied through the second port 262 and selectively enables communication of the third and fourth ports 264 and 266, cooperatively with the first land 268. The first land 268 is provided with an elastic member 272 forming an elastic force that always biases the valve spool to the left in the drawing.

Without a duty control pressure, the valve spool is moved to the right in the drawing by the control pressure supplied through the second port 262 and accordingly the third and fourth ports 264 and 266 communicate with each other. When a duty control pressure of the third proportional control solenoid valve DS3 is received through the first port 260, the valve spool moves to the left in the drawing by an amount corresponding to the duty control pressure and the third port 264 is closed correspondingly.

The second clutch side pressure control valve 66 includes a valve body and a valve spool installed therein. The valve body of the second clutch side pressure control valve 66 includes first to fifth ports 280, 282, 284, 286, and 288. The first port 280 receives a control pressure from the third proportional control solenoid valve DS3. The second port 282 receives a control pressure from the second clutch side switching valve 64. The third port 284 receives the line pressure. The fourth port 286 supplies the hydraulic pressure received through the third port 284 to the second clutch C2. The fifth port 288 exhausts the hydraulic pressure supplied through the fourth port 286.

The valve spool installed in the valve body of the second clutch side pressure control valve 66 includes first to third lands 290, 292, and 294. The first land 290 receives the control pressure supplied through the first port 280. The second land 292 selectively opens/closes the fifth port 288. The third land 294 selectively enables communication of the fourth port 286 to the third and fifth ports 284 and 288, cooperatively with the second land 292. In addition, an elastic member 296 is disposed between the third land 294 and the valve body.

When a control pressure is supplied through the first port 280, the valve spool is moved to the left in the drawing and enables communication of the third and fourth ports 284 and 286 such that the second clutch C2 is supplied with an operating pressure. When the control pressure of the first port 280 is exhausted and a control pressure is supplied through the second port 282, the valve spool is moved to the right in the drawing such that the operating pressure of the second clutch C2 may be exhausted by the communication of the fourth and fifth ports 286 and 288.

Figure 7:
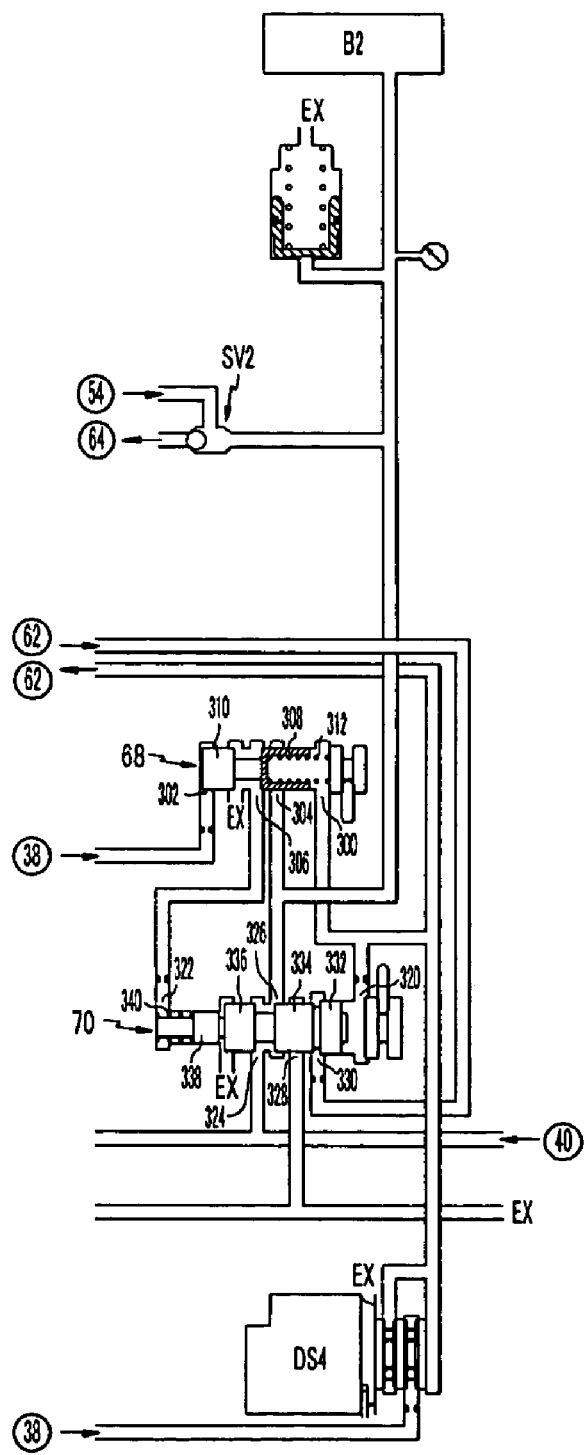
FIG. 7 is detailed diagram of a control portion for a second brake according to an exemplary embodiment of the present invention.

FIG. 7 is a detailed diagram of an exemplary second brake control portion F. The second brake side switching valve 68 includes a valve body and a valve spool installed therein.

The valve body of the second brake side switching valve 68 includes first to fourth ports 300, 302, 304, and 306. The first port 300 receives a control pressure from the fourth proportional control solenoid valve DS4. The second port 302 is disposed opposite to the first port 300 and receives a reduced pressure of the reducing valve 38 as its control pressure. The third port 304 partially receives the operating pressure of the second brake B2 supplied from the second brake side pressure control valve 70. The fourth port 306 supplies the hydraulic pressure of the third port 304 to the second brake side pressure control valve 70 as its control pressure.

The valve spool installed in the valve body of the second brake side switching valve 68 includes first and second lands 308 and 310. The first land 308 receives the control pressure supplied from the first port 300. The second land 310 receives the control pressure supplied through the second port 302 and selectively enables communication of the third and fourth ports 304 and 306, cooperatively with the first land 308. The first land 308 is provided with an elastic member 312 forming an elastic force that always biases the valve spool to the left in the drawing.

Without a duty control pressure, the valve spool is moved to the right in the drawing by the control pressure supplied through the second port 302 and accordingly the third and fourth ports 304 and 306 communicate with each other. When a duty control pressure of the fourth proportional control solenoid valve DS4 is received through the first port 300 the valve spool moves to the left in the drawing by an amount corresponding to the duty control pressure and the third port 304 is closed correspondingly.

The second brake side pressure control valve 70 includes a valve body and a valve spool installed therein. The valve body of the second brake side pressure control valve 70 includes first to sixth ports 320, 322, 324, 326, 328, and 330. The first port 320 receives a control pressure from the fourth proportional control solenoid valve DS4. The second port 322 receives a control pressure from the second brake side switching valve 68. The third port 324 receives the line pressure. The fourth port 326 supplies the hydraulic pressure received through the third port 324 to the second brake B2. The fifth port 328 exhausts the hydraulic pressure supplied through the fourth port 326. The sixth port 330 communicates with the second port 232 of the second switching valve 62.

The valve spool installed in the valve body of the second brake side pressure control valve 70 includes first to fourth lands 332, 334, 336, and 338. The first land 332 receives the control pressure supplied through the first port 320. The second land 334 selectively opens/closes the fifth port 328. The third land 336 selectively enables communication of the fourth port 326 to the third and fifth ports 324 and 328, cooperatively with the second land 332. The fourth land 338 receives the control pressure supplied through the second port 322. In addition, an elastic member 340 is disposed between the fourth land 338 and the valve body.

When a control pressure is supplied through the first port 320, the valve spool is moved to the left in the drawing and enables communication of the third and fourth ports 324 and 326 such that the second brake B2 is supplied with an operating pressure. When the control pressure of the first port 320 is exhausted and a control pressure is supplied through the second port 322, the valve spool is moved to the right in the drawing such that the operating pressure of the second brake B2 may be exhausted by the communication of the fourth and fifth ports 326 and 328.

The first switching valve 54 is connected to an upstream side of the two friction members C2 and B2, interposing a second shuttle valve SV2, such that the hydraulic pressure supplied to the second clutch C2 and the second brake B2 may partially be supplied to the first switching valve 54.

In addition, according to an exemplary embodiment of the present invention, an accumulator AC1 is disposed on the drive pressure line 84 such that the drive pressure may be stabilized. Also, an accumulator AC2 is disposed on the return line such that the hydraulic pressure may be stably maintained in the exhaust of the hydraulic pressure. Similarly, an accumulator is respectively disposed on the lines of the first, second, and third clutches C1, C2, and C3 and the second brake B2 (refer to FIG. 3).

Regarding the first, second, third, and fourth proportional control solenoid valves DS1, DS2, DS3, and DS4 applied to the control portions of the exemplary embodiment of the present invention, the first, second, and third proportional control solenoid valves DS1, DS2, and DS3 output a maximum hydraulic pressure in a turned-off state and the fourth proportional control solenoid valve DS4 outputs a minimum hydraulic pressure in a turned-off state.

In the hydraulic control system according to an exemplary embodiment of the present invention, the first and second on/off solenoid valves and the proportional control solenoid valve are operated according to the following Table 1 for respective speeds.

TABLE 1

|  | SS1 | SS2 | DS1 | DS2 | DS3 | DS4 |
|---|---|---|---|---|---|---|
| L   | LOW  | HIGH | HIGH | HIGH |      |      |
| 1st | LOW  | LOW  | HIGH |      |      |      |
| 2nd | LOW  | LOW  | HIGH |      |      | HIGH |
| 3rd | LOW  | LOW  | HIGH |      | HIGH |      |
| 4th | HIGH | LOW  | HIGH | HIGH |      |      |
| 5th | HIGH | LOW  |      | HIGH | HIGH |      |
| 6th | HIGH | LOW  |      | HIGH |      | HIGH |
| R   | LOW  | LOW  |      |      | HIGH |      |

Hereinafter, operation of the hydraulic control system according to an exemplary embodiment of the present invention will be described in detail.

When an engine is started and accordingly hydraulic pressure is generated by the hydraulic pump 30, the line pressure is supplied to the first and second solenoid valves SS1 and SS2, the manual valve 40, the first switching valve 54, the third clutch side pressure control valve 66, and the control valve 60. In this case, the hydraulic pressure controlled by the reducing valve 38 is respectively supplied to the proportional control solenoid valves DS1, DS2, DS3, and DS4, the first, second, and third clutch side switching valves 50, 64, and 56, and the second brake side switching valve 68 as their control pressures.

When the manual valve 40 is changed to the D range for starting the vehicle, the D range pressure is supplied to the first switching valve 54, the third clutch side pressure control valve 58, and the second brake side pressure control valve 70 through the forward range pressure line 84. In this case, the first switching valve 54 receives the line pressure through its first port 140, such that the valve spool moves to the left in the drawing and thus the second and third ports 142 and 144 communicate with each other. Therefore, the forward range pressure supplied to the second port 142 is delivered to the first clutch side pressure control valve 52 at its third port 126.

As the first proportional control solenoid valve DS1 is duty controlled, the control pressure of the first proportional control solenoid valve DS1 is supplied to the first clutch side switching valve 50 at its first port 100 and also to the first clutch side pressure control valve 52 at its second port 124. Therefore, in this case, their valve spools move to the left in the drawing such that the third port 104 of the first clutch side switching valve 50 is closed, and the third and fourth ports 126 and 128 of the first clutch side pressure control valve 52 communicate with each other. Consequently, the forward range pressure is supplied to the first clutch C1 and shifting to the first forward speed is realized (refer to FIG. 4).

When the vehicle speed increases from such a state of the first forward speed, the transmission control unit (not shown) starts the duty control of the fourth proportional control solenoid valve DS4 (refer to FIG. 7).

Then, the duty control pressure of the fourth duty solenoid valve DS4 is supplied to the second brake side pressure control valve 70 at its first port 320, and accordingly, the valve spool moved to the right in the drawing now moves to the left by the supplied duty control pressure. Consequently, the third and fourth ports 324 and 326 become to communicate with each other, and the hydraulic pressure supplied to the third port 324 is now supplied to the second brake B2 through the fourth port 326.

At the same time, the duty control pressure of the fourth duty solenoid valve DS4 is also supplied to the second brake side switching valve 68 at its first port 300 as a control pressure. By such a control pressure, the valve spool once moved to the right in the drawing now begins to move to the left.

At this time, the reduced pressure acts on the valve spool at a side opposite to the first port 300 as a control pressure, and therefore, the moving speed of the valve spool is lowered. Accordingly, the operating pressure supplied to the second brake B2 from the second brake side pressure control valve 70 is partially supplied back to the second brake side pressure control valve 70 at its second port 322, through the third and fourth ports 304 and 306. Then, the valve spool moving to the left in the second brake side pressure control valve 70 is slowed, and accordingly the hydraulic pressure supplied to the second brake B2 gradually increases.

When the valve spool of the second brake side switching valve 68 fully moves to the right, the third port 304 becomes closed. In this case, the control pressure supplied to the second brake side pressure control valve 70 at its second port 322 is now exhausted, and accordingly, the valve spool of the second brake side pressure control valve 70 fully moves to the left in the drawing. Therefore, the forward range pressure is normally supplied to the second brake B2, and thus shifting to the second forward speed, realized by the first clutch C1 and the second brake B2, is finished.

As can be understood from the above description, the second brake side switching valve 68 and the second brake side pressure control valve 70 cooperatively operate such that the operating pressure supplied to the second brake B2 may be reduced in an early stage of shifting and the operating pressure may normally be supplied at a finishing stage of the shifting. Therefore, the precision of the shift control may be enhanced.

When the vehicle speed further increases from the second forward speed, the transmission control unit turns off the duty control of the fourth proportional control solenoid valve DS4 and then begins the duty control of the third proportional control solenoid valve DS3 (hereinafter, refer to FIG. 6).

Accordingly, the hydraulic pressure supplied to the second brake B2 is exhausted, the duty control pressure of the third proportional control solenoid valve DS3 is supplied to the second clutch side pressure control valve 66 at its first port 280. Accordingly, the valve spool moved to the right in the drawing now moves to the left by the supplied duty control pressure. Consequently, the third and fourth ports 284 and 286 become to communicate with each other, and the hydraulic pressure supplied to the third port 284 is now supplied to the second clutch C2 through the fourth port 286.

At the same time, the duty control pressure of the third duty solenoid valve DS3 is also supplied to the second clutch side switching valve 64 at its the first port 260 as a control pressure. By such a control pressure, the valve spool once moved to the right in the drawing now begins to move to the left.

At this time, the reduced pressure acts on the valve spool at a side opposite to the first port 260 as a control pressure, and therefore, the moving speed of the valve spool is lowered. Accordingly, the operating pressure supplied to the second clutch C2 from the second clutch side pressure control valve 66 is partially supplied back to the second clutch side pressure control valve 66 at its second port 282, through the third and fourth ports 264 and 266. Then, the valve spool moving to the left in the second clutch side pressure control valve 66 is slowed, and accordingly the hydraulic pressure supplied to the second clutch C2 gradually increases.

When the valve spool of the second clutch side switching valve 64 fully moves to the right, the third port 264 becomes closed. In this case, the control pressure supplied to the second clutch side pressure control valve 66 at its second port 282 is now exhausted, and accordingly, the valve spool of the second clutch side pressure control valve 66 fully moves to the left in the drawing. Therefore, the forward range pressure is normally supplied to the second clutch C2, and thus shifting to the third forward speed, realized by the first and second clutches C1 and C2, is finished.

As can be understood from the above description, the second clutch side switching valve 64 and the second clutch side pressure control valve 66 cooperatively operate such that the operating pressure supplied to the second clutch C2 may be reduced in an early stage of shifting and the operating pressure may normally be supplied at a finishing stage of the shifting. Therefore, the precision of the shift control may be enhanced.

When the vehicle speed further increases from the third forward speed, the transmission control unit turns off the duty control of the third proportional control solenoid valve DS3. In addition, it begins the duty control of the second proportional control solenoid valve DS2, and controls the first on/off solenoid valve SS1 to be turned on (hereinafter, refer to FIG. 5).

Accordingly, the hydraulic pressure supplied to the second clutch C2 is exhausted, and the duty control pressure of the second proportional control solenoid valve DS2 is supplied to the third clutch side pressure control valve 58 at its first port 180. Accordingly, the valve spool moved to the right in the drawing now moves to the left by the supplied duty control pressure. Consequently, the third and fourth ports 184 and 186 become to communicate with each other, and the hydraulic pressure supplied to the third port 184 is now supplied to the third port 204 of the control valve 60 through the fourth port 186.

At the same time, the duty control pressure of the second duty solenoid valve DS2 is also supplied to the third clutch side switching valve 56 at its the first port 160 as a control pressure. By such a control pressure, the valve spool once moved to the right in the drawing now begins to move to the left in the drawing.

At this time, the reduced pressure acts on the valve spool at a side opposite to the first port 160 as a control pressure, and therefore, the moving speed of the valve spool is lowered. Accordingly, the operating pressure supplied to the third clutch C3 from the third clutch side pressure control valve 58 is partially supplied back to the third clutch side pressure control valve 58 at its second port 182, through the third and fourth ports 164 and 166. Then, the valve spool moving to the left in the third clutch side pressure control valve 58 is slowed, and accordingly the hydraulic pressure supplied to the third clutch C3 gradually increases.

When the valve spool of the third clutch side switching valve 56 fully moves to the right, the third port 164 becomes closed. In this case, the control pressure supplied to the third clutch side pressure control valve 58 at its second port 182 is now exhausted, and accordingly, the valve spool of the third clutch side pressure control valve 58 fully moves to the left in the drawing. Therefore, the forward range pressure is normally supplied to the third clutch C3 through the control valve 60 and the second switching valve 62, and thus shifting to the fourth forward speed, realized by the first and third clutches C1 and C3, is finished.

During such a process of supplying the hydraulic pressure, the control valve 60 receives the line pressure through its first port 200, and accordingly, the valve spool remains moved to the left in the drawing. Therefore, the hydraulic pressure supplied to the third port 204 is output through the fifth port 208 to the third port 234 of the second switching valve 62. At this time, the valve spool of the second switching valve 62 biased to the left by the elastic force of the elastic member 254 receives the control pressure through the eighth port 244 by turning on of the first on/off solenoid valve SS1. Therefore, the valve spool moves to the right in the drawing, such that the hydraulic pressure may be supplied to the third clutch C3 because the third and fourth ports 234' and 236 communicate with each other.

As can be understood from the above description, the hydraulic pressure supplied to the third clutch C3 is partially supplied to the first switching valve 54. In addition, the third clutch side switching valve 56 and the third clutch side pressure control valve 58 cooperatively operate such that the operating pressure supplied to the third clutch C3 may be reduced in an early stage of shifting and the operating pressure may normally be supplied at a finishing stage of the shifting. Therefore, the precision of the shift control may be enhanced.

When the vehicle speed further increases from the fourth forward speed, the transmission control unit turns off the duty control of the first proportional control solenoid valve DS1 and then begins the duty control of the third proportional control solenoid valve DS3.

Accordingly, the hydraulic pressure supplied to the first clutch C1 is exhausted, while the third clutch C3 remains operating. The duty control pressure of the third proportional control solenoid valve DS3 is supplied to the second clutch side pressure control valve 66 at its first port 280. Accordingly, the valve spool moved to the right in the drawing now moves to the left by the supplied duty control pressure. Consequently, the third and fourth ports 284 and 286 become to communicate with each other, and the hydraulic pressure supplied to the third port 284 is now supplied to the second clutch C2 through the fourth port 286.

At the same time, the duty control pressure of the third duty solenoid valve DS3 is also supplied to the second clutch side switching valve 64 at its first port 260 as a control pressure. By such a control pressure, the valve spool once moved to the right in the drawing now begins to move to the left.

At this time, the reduced pressure acts on the valve spool at a side opposite to the first port 260 as a control pressure, and therefore, the moving speed of the valve spool is lowered. Accordingly, the operating pressure supplied to the second clutch C2 from the second clutch side pressure control valve 66 is partially supplied back to the second clutch side pressure control valve 66 at its second port 282, through the third and fourth ports 264 and 266. Then, the valve spool moving to the left in the second clutch side pressure control valve 66 is slowed, and accordingly the hydraulic pressure supplied to the second clutch C2 gradually increases.

When the valve spool of the second clutch side switching valve 64 fully moves to the right, the third port 264 becomes closed. In this case, the control pressure supplied to the second clutch side pressure control valve 66 at its second port 282 is now exhausted, and accordingly, the valve spool of the second clutch side pressure control valve 66 fully moves to the left in the drawing. Therefore, the forward range pressure is normally supplied to the second clutch C2, and thus shifting to the fifth forward speed, realized by the second and third clutches C2 and C3, is finished.

As can be understood from the above description, the second clutch side switching valve 64 and the second clutch side pressure control valve 66 cooperatively operate such that the operating pressure supplied to the second clutch C2 may be reduced in an early stage of shifting and the operating pressure may normally be supplied at a finishing stage of the shifting. Therefore, the precision of the shift control may be enhanced.

When the vehicle speed further increases from the fifth forward speed, the transmission control unit turns off the duty control of the third proportional control solenoid valve DS3 and then begins the duty control of the fourth proportional control solenoid valve DS4 (hereinafter, refer to FIG. 7).

Then, the duty control pressure of the fourth duty solenoid valve DS4 is supplied to the second brake side pressure control valve 70 at its first port 320, and accordingly, the valve spool moved to the right in the drawing now moves to the left in the drawing by the supplied duty control pressure. Consequently, the third and fourth ports 324 and 326 become to communicate with each other, and the hydraulic pressure supplied to the third port 324 is now supplied to the second brake B2 through the fourth port 326.

At the same time, the duty control pressure of the fourth duty solenoid valve DS4 is also supplied to the second brake side switching valve 68 at its first port 300 as a control pressure. By such a control pressure, the valve spool once moved to the right in the drawing now begins to move to the left.

At this time, the reduced pressure acts on the valve spool at a side opposite to the first port 300 as a control pressure, and therefore, the moving speed of the valve spool is lowered. Accordingly, the operating pressure supplied to the second brake B2 from the second brake side pressure control valve 70 is partially supplied back to the second brake side pressure control valve 70 at its second port 322, through the third and fourth ports 304 and 306. Then, the valve spool moving to the left in the second brake side pressure control valve 70 is slowed, and accordingly the hydraulic pressure supplied to the second brake B2 gradually increases.

When the valve spool of the second brake side switching valve 68 fully moves to the right, the third port 304 becomes closed. In this case, the control pressure supplied to the second brake side pressure control valve 70 at its second port 322 is now exhausted, and accordingly, the valve spool of the second brake side pressure control valve 70 fully moves to the left in the drawing. Therefore, the forward range pressure is normally supplied to the second brake B2, and thus shifting to the sixth forward speed, realized by the third clutch C3 and the second brake B2, is finished.

As can be understood from the above description, the second brake side switching valve 68 and the second brake side pressure control valve 70 cooperatively operate such that the operating pressure supplied to the second brake B2 may be reduced in an early stage of shifting and the operating pressure may normally be supplied at a finishing stage of the shifting. Therefore, the precision of the shift control may be enhanced.

At the reverse speed, the reverse range pressure is directly supplied to the first brake B1 through the reverse range pressure line 82 of the manual valve 40, and at the same time, the duty control of the third duty solenoid valve DS3 begins.

Then, the hydraulic pressure is supplied to the second clutch C2 in the same way as in the third and fifth forward speeds, and thus shifting to the reverse speed is realized.

During the shifting of the six forward speeds and the one reverse speed, the hydraulic control system according to an exemplary embodiment of the present invention may provide a fail-safe function in two ways, i.e., against a malfunctioning of an element such as a solenoid valve by a short and/or open circuits.

In more detail, in the case of malfunctioning in the low gears of the first, second, and third forward speeds, the transmission is fixedly operated at the third forward speed. In the case of malfunctioning in the high gears of the fourth, fifth, and sixth forward speeds, the transmission is fixedly operated at the fifth forward speed.

This is because the first, second, and third proportional control solenoid valves DS1, DS2, and DS3 output a maximum amount of hydraulic fluid in the case of the turned-off state, and the fourth proportional control solenoid valve DS4 does not output hydraulic pressure in the case of the turned-off state.

In more detail, when the malfunctioning occurs at the first forward speed where the first clutch C1 operates, the second and third proportional control solenoid valves DS2 and DS3 are turned off and output maximum control pressure. Therefore, by the output pressure of the second proportional control solenoid valve DS2, the hydraulic pressure of the third clutch side pressure control valve 58 is supplied to the second switching valve 62 through the control valve 60.

However, since the second switching valve 62 is not supplied with a control pressure, its valve spool remains moved to the left in the drawing. Therefore, the third port 234 is closed and the hydraulic pressure is not supplied to the third clutch C3.

In addition, the hydraulic pressure of the second clutch side pressure control valve 66 is supplied to the second clutch C2 by the output pressure of the third proportional control solenoid valve DS3. Therefore, the third forward speed is fixedly realized by the operation of the first and second clutches C1 and C2.

When the malfunctioning occurs at the second forward speed where the first clutch C1 and the second brake B2 operate, the fourth proportional control solenoid valve DS4 controlling the second brake B2 is turned off and stops supplying hydraulic pressure, and accordingly the second brake B2 is released. Therefore, as in the malfunctioning at the first forward speed, the first clutch C1 and the second brake B2 operate to form the third forward speed.

When the malfunctioning occurs at the fourth forward speed where the second and third clutches C2 and C3 operate, the hydraulic pressure supplied to the third clutch C3 is partially supplied to the third land 250 of the valve spool through the sixth port 240 even if the first on/off solenoid valve SS1 stops outputting hydraulic pressure. Therefore, the valve spool is prevented from moving left, and accordingly the third clutch continues receiving the hydraulic pressure.

In addition, the second clutch C2 receives the hydraulic pressure since the third proportional control solenoid valve DS3 outputs maximum pressure. Since the hydraulic pressures supplied to the second and third clutches C2 and C3 are supplied to the third and fourth ports 146 and 148 of the first switching valve 54, the second port 142 of the first switching valve 54 is blocked such that the hydraulic pressure supplied to the first clutch C1 is exhausted. Therefore, the fifth forward speed is fixedly realized by the operation of the second and third clutches C2 and C3.

When the malfunction occurs at the sixth forward speed where the third clutch C3 and the second brake B2 operate, as in the malfunctioning at the fourth forward speed, the second brake B2 stops its operation and instead the second clutch C2 operates, while the third clutch C3 maintains its operation Although the first proportional control solenoid valve DS1 is turned off and outputs hydraulic pressure, the first switching valve 54 does not output the hydraulic pressure by the operation of the second and third clutches C2 and C3, which is the same as in the malfunctioning at the fourth forward speed. Therefore, in this case, the first clutch C1 does not operate.

Therefore, the fifth forward speed is fixedly realized by the operation of the second and third clutches C2 and C3, and thus abrupt shifting to the third forward speed is prevented when the vehicle is driven in the high gears.

When the engine is turned off and then restarted from such a fail-safe mode, the third forward speed is enabled, of course, and thus stronger drive torque than in the fifth forward speed may be achieved.

In addition, regarding the second brake B2, the output pressure of the fourth proportional control solenoid valve DS4 is designed to be supplied to the sixth port 340 of the second brake side pressure control valve 70 through the first and second ports 230 and 232 of the second switching valve 62, such that the hydraulic pressure control valve controlling operational elements may be controlled in different pressure ranges when shifting between high and low gears. Accordingly, the precision of hydraulic pressure control has been enhanced.

In addition, the first brake B1 and the third clutch C3 are controlled by only one pressure control valve (the third clutch side pressure control valve 58) in cooperation with the control valve 60 and the second on/off solenoid valve SS2. Thus, configuration of a hydraulic control system may be simplified.

As described above, an hydraulic control system of an exemplary embodiment of the present invention applied to a powertrain of a six-speed automatic transmission having five friction members prevents abrupt shift shock by providing a fail-safe function in two ways.

According to an embodiment of the present invention, a hydraulic pressure control valve and a switching valve are applied to each frictional element, and in particular, the controlling pressure range of the second brake may be changed depending on high and low gears. Therefore, more precise and more effective control is enabled, achieving minimization of shift shock, an enhancement of drivability, and also an enhancement of fuel consumption.

Furthermore, the first brake and the third clutch are controlled by one pressure control valve, and accordingly, an overall performance of an automatic transmission may be enhanced by a simplified configuration of a hydraulic control system.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A hydraulic control system of a six-speed automatic transmission for a vehicle, comprising:
   a first clutch control portion controlling a forward range pressure according to a control of a first proportional control solenoid valve so as to supply the forward range pressure to a first clutch at first, second, third, and fourth forward speeds and preventing hydraulic pressure from being supplied to the first clutch when the first proportional control solenoid valve is turned-off at fifth, and sixth forward speeds;
   a first brake and third clutch control portion controlling and selectively supplying the forward range pressure to a first brake or a third clutch according to a control of a second proportional control solenoid valve at the fourth, fifth, and sixth forward speeds, a low L range, and a reverse R range and maintaining a hydraulic line to the third clutch at the fourth, fifth, and sixth forward speeds in the case that an on/off solenoid valve controlling a spool valve controlling the hydraulic line to the third clutch malfunctions to be turned off;
   a second clutch control portion supplying a line pressure to a second clutch according to a control of a third proportional control solenoid valve at the third and fifth forward speeds and a reverse speed; and
   a second brake control portion supplying the forward range pressure to a second brake according to a control of a fourth proportional control solenoid valve at the second and sixth forward speeds and controlling an operating pressure of the second brake to be larger at the sixth forward speed than at the second forward speed.

2. The hydraulic control system of claim 1, wherein:
   the first, second, and third proportional control solenoid valves are duty control valves outputting a maximum hydraulic pressure in a turned-off state; and
   the fourth proportional control solenoid valve is a duty control valve outputting a minimum hydraulic pressure in a turned-off state.

3. The hydraulic control system of claim 1, wherein the first clutch control portion comprises:
   a first clutch side switching valve and a first clutch side pressure control valve controlled by the first proportional control solenoid valve; and
   a first switching valve controlling operating pressure supply to the first clutch through the first clutch side pressure control valve by controlling a hydraulic line of the forward range pressure supplied from a manual valve.

4. The hydraulic control system of claim 3, wherein the first clutch side switching valve comprises;
   a valve body comprising a first port receiving a control pressure from the first proportional control solenoid valve, a second port formed at an opposite side of the first port and receiving a reduced pressure of the reducing valve as control pressure of the first clutch side switching valve, a third port partially receiving the operating pressure supplied to the first clutch, and a fourth port selectively supplying the hydraulic pressure received through the third port to the first clutch side pressure control valve as a control pressure thereof; and
   a valve spool comprising a first land receiving the control pressure supplied from the first port, and a second land receiving the control pressure supplied through the second port and selectively enabling communication of the third and fourth ports, cooperatively with the first land, wherein an elastic member is disposed between the first land and the valve body.

5. The hydraulic control system of claim 3, wherein the first clutch side pressure control valve comprises:

a valve body comprising a first port receiving a control pressure from the first clutch side switching valve, a second port receiving a control pressure from the first proportional control solenoid valve, a third port receiving an operating pressure of the first clutch supplied from the first switching valve, a fourth port selectively supplying the hydraulic pressure received through the third port to the first clutch, and a fifth port returning the hydraulic pressure received through the fourth port; and a valve spool comprising a first land selectively closing the third port by the control pressure received through the first port, a second land enabling communication of the third and fourth ports or the fourth and fifth ports in cooperation with the first land, and a third land receiving the control pressure supplied through the second port, wherein an elastic member is disposed between the first land and the valve body.

6. The hydraulic control system of claim 3, wherein the first switching valve comprises:

a valve body comprising a first port receiving a forward range pressure, a second port receiving the line pressure, a third port supplying the line pressure received through the second port to the first clutch side pressure control valve, a fourth port receiving the operating pressures of the second clutch and the second brake as control pressure of the first switching valve, a fifth port receiving the operating pressure of the third clutch as control pressure of the first switching valve, and a sixth port exhausting the hydraulic pressure received through the third port; and a valve spool comprising a first land receiving the control pressure supplied through the second port, a second land receiving the hydraulic pressure supplied through the fifth port and selectively enabling communication of the third port to the first and sixth ports, and a third land receiving the control pressure supplied through the fourth port, wherein an elastic member is disposed between the third land and the valve body.

7. The hydraulic control system of claim 6, wherein the first switching valve is structured such that, while the control pressure is supplied through the first port, the valve spool does not move toward the first port in response to a control pressure supplied through only one port of the fourth and fifth ports.

8. The hydraulic control system of claim 1, wherein the first brake and third clutch control portion comprises:

a third clutch side switching valve and a third clutch side pressure control valve controlled by the second proportional control solenoid valve;

a control valve controlled by the liner pressure and an on/off solenoid valve and enabling hydraulic line conversion of hydraulic pressure supplied from the third clutch side pressure control valve;

a second switching valve controlled by an on/off solenoid valve and supplying the hydraulic pressure supplied from the control valve to the third clutch.

9. The hydraulic control system of claim 8, wherein the third clutch side switching valve comprises:

a valve body comprising a first port receiving a control pressure from the second proportional control solenoid valve, a second port formed at an opposite side of the first port and receiving a reduced pressure of the reducing valve as its control pressure, a third port partially receiving the operating pressure supplied to the first brake or the third clutch, and a fourth port selectively supplying the hydraulic pressure received through the third port to the third clutch side pressure control valve as a control pressure thereof; and a valve spool comprising a first land receiving the control pressure supplied from the first port and a second land receiving the control pressure supplied through the second port and selectively enabling communication of the third and fourth ports, wherein the first land is provided with an elastic member forming an elastic force that always biases the valve spool to the left in the drawing.

10. The hydraulic control system of claim 8, wherein the third clutch side pressure control valve comprises:

a valve body comprising a first port receiving a control pressure from the second proportional control solenoid valve, a second port receiving a control pressure from the third clutch side switching valve, a third port receiving the forward range pressure from the manual valve, a fourth port supplying the hydraulic pressure received through the third port to the control valve and the third clutch side switching valve, and a fifth port returning the hydraulic pressure received through the fourth port; and a valve spool comprising a first land selectively closing the third port by the control pressure received through the second port, a second land enabling communication of the third and fourth ports or the fourth and fifth ports in cooperation with the first land, and a third land receives the control pressure supplied through the second port, wherein an elastic member is disposed between the first land and the valve body.

11. The hydraulic control system of claim 8, wherein the control valve comprises:

a valve body comprising a first port receiving the line pressure, a second port receiving a control pressure from the second on/off solenoid valve, a third port receiving a hydraulic pressure from the third clutch side pressure control valve, a fourth port supplying the hydraulic pressure received through the third port to the first brake as an operating pressure thereof, a fifth port supplying the hydraulic pressure received through the third port to the second switching valve, a sixth port exhausting the hydraulic pressure supplied through the fifth port, and a seventh port receiving an operating pressure from the third clutch as control pressure of the control valve; and a valve spool comprising a first land receiving a control pressure supplied through the second port, a second land selectively enabling communication of the fourth port to an exhaust port, a third land selectively enabling communication of the third port to the fourth and fifth ports, a fourth land selectively opening the fifth port by the control pressure supplied through the first port, and a fifth land receiving the control pressure supplied through the seventh port.

12. The hydraulic control system of claim 8, wherein the second switching valve comprises:

a valve body comprising a first port receiving a control pressure from the fourth proportional control solenoid valve, a second port supplying the control pressure received through the first port to the second brake side pressure control valve, a third port receiving a hydraulic pressure from the control valve as an operating pressure for the third clutch, a fourth port supplying the hydraulic pressure received through the third port to the third clutch, a fifth port exhausting the hydraulic pressure supplied through the fourth port, sixth and seventh ports bifurcated from the fourth port and utilizing the hydraulic pressure output from the fourth port as a control pressure of the second switching valve, and an eighth port receiving a control pressure from the first on/off solenoid valve; and a valve spool comprising a first land selectively opening the first port, a second land selectively enabling communication of the first and second ports in cooperation with the first land, a third land selectively enabling communication of the third and fourth ports in cooperation with the second land, and a fourth land receiving the control pressure supplied through the eighth port, wherein the third land and the fourth land are dividedly formed, and an elastic member is disposed between the first land and the valve body.

13. The hydraulic control system of claim 12, wherein the third and fourth lands are dividedly formed such that the divided position may be placed at the sixth port when the valve spool is moved to the right and at the seventh port when moved to the left.

14. The hydraulic control system of claim 1, wherein the second clutch control portion comprises a second clutch side switching valve and a second clutch side pressure control valve that are controlled by the third proportional control solenoid valve such that a hydraulic pressure may be supplied to the second clutch.

15. The hydraulic control system of claim 14, wherein the second clutch side switching valve comprises:

a valve body comprising a first port receiving a control pressure from the third proportional control solenoid valve, a second port disposed opposite to the first port and receiving a reduced pressure of the reducing valve as control pressure of the second clutch side switching valve, a third port partially receiving the operating pressure of the second clutch supplied from the second clutch side pressure control valve, and a fourth port supplying the hydraulic pressure selectively received through the third port to the second clutch side pressure control valve as its control pressure; and a valve spool comprising a first land receiving a control pressure supplied through the first port and a second land receiving a control pressure supplied through the second port and selectively enabling communication of the third and fourth ports in cooperation with the first land, wherein an elastic member is disposed between the first land and the valve body.

16. The hydraulic control system of claim 14, wherein the second clutch side pressure control valve comprises:

a valve body comprising a first port receiving a control pressure from the third proportional control solenoid valve, a second port receiving a control pressure from the second clutch side switching valve, a third port receiving the line pressure, a fourth port supplying the hydraulic pressure received through the third port to the second clutch, and a fifth port exhausting the hydraulic pressure supplied through the fourth port; and a valve spool comprising a first land receiving the control pressure supplied through the first port, a second land selectively opening/closing the fifth port, and a third land selectively enabling communication of the fourth port to the third and fifth ports in cooperation with the second land, wherein an elastic member is disposed between the third land and the valve body.

17. The hydraulic control system of claim 14, wherein the first switching valve is connected to an upstream side of the second clutch and the second brake, interposing a second shuttle valve, such that the hydraulic pressure supplied to the second clutch and the second brake may partially be supplied to the first switching valve.

18. The hydraulic control system of claim 1, wherein the second brake control portion comprises a second brake side switching valve and a second brake side pressure control valve that are controlled by the fourth proportional control solenoid valve such that the second brake may receive an hydraulic pressure.

19. The hydraulic control system of claim 18, wherein the second brake side pressure control valve comprises:

a valve body comprising a first port receiving a control pressure from the fourth proportional control solenoid valve, a second port receiving a control pressure from the second brake side switching valve, a third port receiving the line pressure, a fourth port supplying the hydraulic pressure received through the third port to the second brake, a fifth port exhausting the hydraulic pressure supplied through the fourth port, and a sixth port communicating with the second port of the second switching valve; and a valve spool comprising a first land receiving the control pressure supplied through the first port, a second land selectively opening/closing the fifth port, a third land selectively enabling communication of the fourth port to the third and fifth ports in cooperation with the second land, and a fourth land receiving the control pressure supplied through the second port, wherein an elastic member is disposed between the fourth land and the valve body.

20. The hydraulic control system of claim 18, wherein the second brake side switching valve comprises:

a valve body comprising a first port receiving a control pressure from the fourth proportional control solenoid valve, a second port disposed opposite to the first port and receiving a reduced pressure of the reducing valve as control pressure of the second brake side switching valve, a third port partially receiving the operating pressure of the second brake supplied from the second brake side pressure control valve, and a fourth port supplying the hydraulic pressure of the third port to the second brake side pressure control valve as control pressure of the second brake side pressure control valve; and a valve spool comprising a first land receiving the control pressure supplied from the first port and a second land receiving the control pressure supplied through the second port and selectively enabling communication of the third and fourth ports in cooperation with the first land, wherein an elastic member is disposed between the first land and the valve body.

* * * * *